(12) United States Patent
Haraguchi et al.

(10) Patent No.: US 11,251,458 B2
(45) Date of Patent: Feb. 15, 2022

(54) CYLINDRICAL BATTERIES

(71) Applicant: SANYO Electric Co., Ltd., Daito (JP)

(72) Inventors: Shin Haraguchi, Hyogo (JP); Kyosuke Miyata, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 111 days.

(21) Appl. No.: 16/757,077

(22) PCT Filed: Oct. 15, 2018

(86) PCT No.: PCT/JP2018/038240
§ 371 (c)(1),
(2) Date: Apr. 17, 2020

(87) PCT Pub. No.: WO2019/082712
PCT Pub. Date: May 2, 2019

(65) Prior Publication Data
US 2020/0259202 A1 Aug. 13, 2020

(30) Foreign Application Priority Data

Oct. 23, 2017 (JP) .............................. JP2017-204463

(51) Int. Cl.
*H01M 10/04* (2006.01)
*H01M 10/0587* (2010.01)
(Continued)

(52) U.S. Cl.
CPC ... *H01M 10/0422* (2013.01); *H01M 10/0431* (2013.01); *H01M 10/0587* (2013.01);
(Continued)

(58) Field of Classification Search
CPC ......... H01M 10/0422; H01M 10/0431; H01M 10/0587; H01M 50/30; H01M 50/572; H01M 50/171; H01M 50/166
See application file for complete search history.

(56) References Cited

U.S. PATENT DOCUMENTS

| 2015/0333313 A1 | 11/2015 | Yamato et al. |
| 2018/0047949 A1 | 2/2018 | Sugimoto et al. |

(Continued)

FOREIGN PATENT DOCUMENTS

| WO | 2014097586 A1 | 6/2014 |
| WO | 2016157748 A1 | 10/2016 |
| WO | 2018179721 A1 | 10/2018 |

OTHER PUBLICATIONS

International Search Report dated Jan. 15, 2019, issued in counterpart Application No. PCT/JP2018/038240, with English Translation. (2 pages).

*Primary Examiner* — Christopher P Domone
*Assistant Examiner* — Kimberly Wyluda
(74) *Attorney, Agent, or Firm* — Westerman, Hattori, Daniels & Adrian, LLP (57) ABSTRACT

A cylindrical battery with an electrode assembly, an electrolytic solution, a bottomed cylindrical exterior case accommodating the electrode assembly and the electrolytic solution, and a sealing unit fixed by crimping of an open end portion of the exterior case via a gasket. The sealing unit includes a valve member which has a protrudent portion that is annular in plan view, an insulating plate which is fitted within the inner periphery of the protrudent portion and which has an outer peripheral skirt portion, and a metal plate which is fixed within the inner periphery of the skirt portion of the insulating plate and which is connected to a central portion of the valve member. The tip of the protrudent portion is located at a level which does not reach the level of a second surface portion of the metal plate in the direction of thickness of the sealing unit.

3 Claims, 3 Drawing Sheets

(51) Int. Cl.
  *H01M 50/30* (2021.01)
  *H01M 50/166* (2021.01)
  *H01M 50/572* (2021.01)
  *H01M 50/171* (2021.01)

(52) U.S. Cl.
  CPC ....... *H01M 50/166* (2021.01); *H01M 50/171* (2021.01); *H01M 50/30* (2021.01); *H01M 50/572* (2021.01)

(56) References Cited

U.S. PATENT DOCUMENTS

2020/0083494 A1* 3/2020 Bae .................... H01M 10/058
2021/0119286 A1* 4/2021 Enomoto ............ H01M 50/154
2021/0119299 A1* 4/2021 Enomoto .......... H01M 10/0477

* cited by examiner

ENLARGED VIEW OF PORTION A

Figure 3

CYLINDRICAL BATTERIES

TECHNICAL FIELD

The present invention relates to a cylindrical battery which includes a sealing unit having a current interrupting mechanism.

BACKGROUND ART

PTL 1 discloses a cylindrical battery which has a sealing unit including a current interrupting mechanism composed of a valve member, an insulating member and a metal member. In the sealing unit of this cylindrical battery, the valve member has an annular protrudent portion, and the insulating member has a skirt portion at its outer periphery. The metal plate is fitted within the inner periphery of the skirt portion of the insulating member and is thereby fixed therein. This insulating member is fixed by the crimping of the inner periphery of the protrudent portion of the valve member against the outer periphery of the insulating member. Central portions of the valve member and the metal plate are connected together by, for example, laser welding or the like.

CITATION LIST

Patent Literature

PTL 1: WO 2016/157748

SUMMARY OF INVENTION

Technical Problem

In the cylindrical battery which is equipped with the sealing unit described in PTL 1, the protrudent portion of the valve member extends downward to such an extent that the tip thereof is located below the level of the edge face of the metal plate. Thus, in the event that an external impact applies a load which pushes the sealing unit in the radial direction, the protrudent portion of the valve member causes the metal plate to receive the impact load on its outer peripheral portion throughout the plate thickness, and consequently the metal plate is sometimes deformed so that its central portion is bent into convex toward the inside of the battery. A contact of such a deformed metal plate with an electrode assembly inside the battery can cause internal short-circuiting.

In a cylindrical battery equipped with a sealing unit in which a metal plate is fixed with a protrudent portion of a valve member, an object of the present invention is to reduce the deformation of the metal plate by a load on the sealing unit in the radial direction, and thereby prevent the occurrence of an internal short-circuit.

Solution to Problem

A cylindrical battery according to the present invention includes an electrode assembly including a positive electrode plate and a negative electrode plate wound together via a separator, an electrolytic solution, a bottomed cylindrical exterior case accommodating the electrode assembly and the electrolytic solution, and a sealing unit fixed by crimping of an open end portion of the exterior case via a gasket. The sealing unit includes a valve member which has an annular protrudent portion projecting toward the inside of the battery, an insulating plate which is fitted within the inner periphery of the protrudent portion and which has an outer peripheral skirt portion, and a metal plate which is fixed within the inner periphery of the skirt portion of the insulating plate and which is connected to a central portion of the valve member. The metal plate has a first surface portion on a side thereof adjacent to the valve member and a second surface portion on a side thereof opposite from the valve member. The tip of the protrudent portion is located at a level which does not reach the level of the second surface portion of the metal plate in the direction of thickness of the sealing unit.

Advantageous Effects of Invention

In the cylindrical battery according to the present invention, the tip of the protrudent portion is located at a level which does not reach, in the direction of thickness of the sealing unit, the level of the second surface portion of the metal plate fixed within the inner periphery of the protrudent portion through the insulating plate. When the sealing unit receives a load in the radial direction, the above configuration reduces the amount of load transmitted from the valve member to the metal plate through the protrudent portion, and thus lessens the bending deformation of the metal plate. Consequently, the occurrence of an internal short-circuit in the battery can be prevented.

DESCRIPTION OF EMBODIMENTS

Hereinbelow, embodiments of the present invention will be described in detail with reference to the accompanying drawings. In the description, specific shapes, materials, numerical values, directions, etc. are only illustrations for helping understanding of the present invention, and may be changed appropriately in accordance with use applications, purposes, specifications and the like. While the following description may illustrate a plurality of embodiments and other examples such as modified examples, the use of an appropriate combination of characteristics of such embodiments and examples is within the original intentions.

Figure 1:
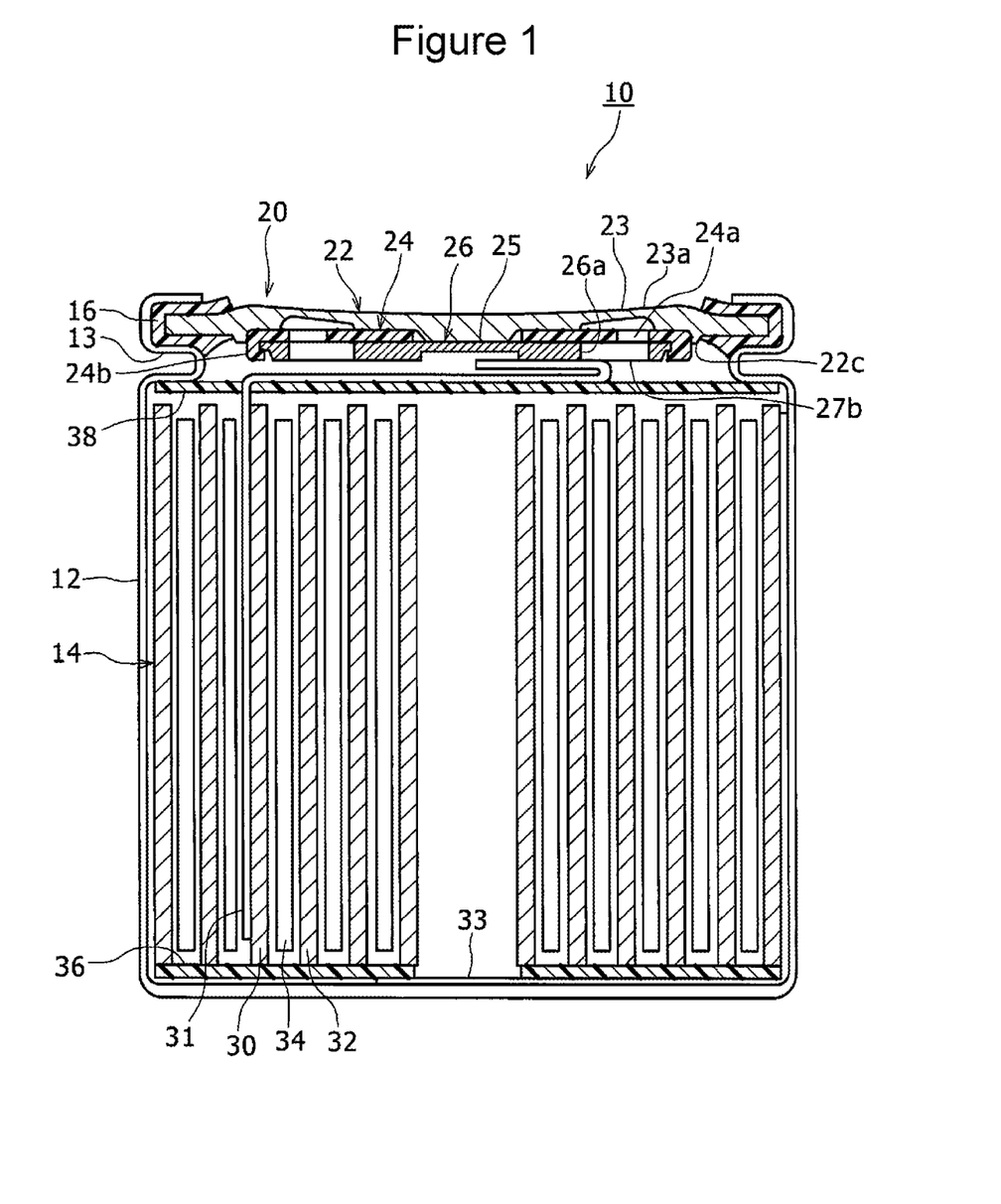
FIG. 1 is a sectional view of a cylindrical battery according to an embodiment of the present invention.
Figure 2:
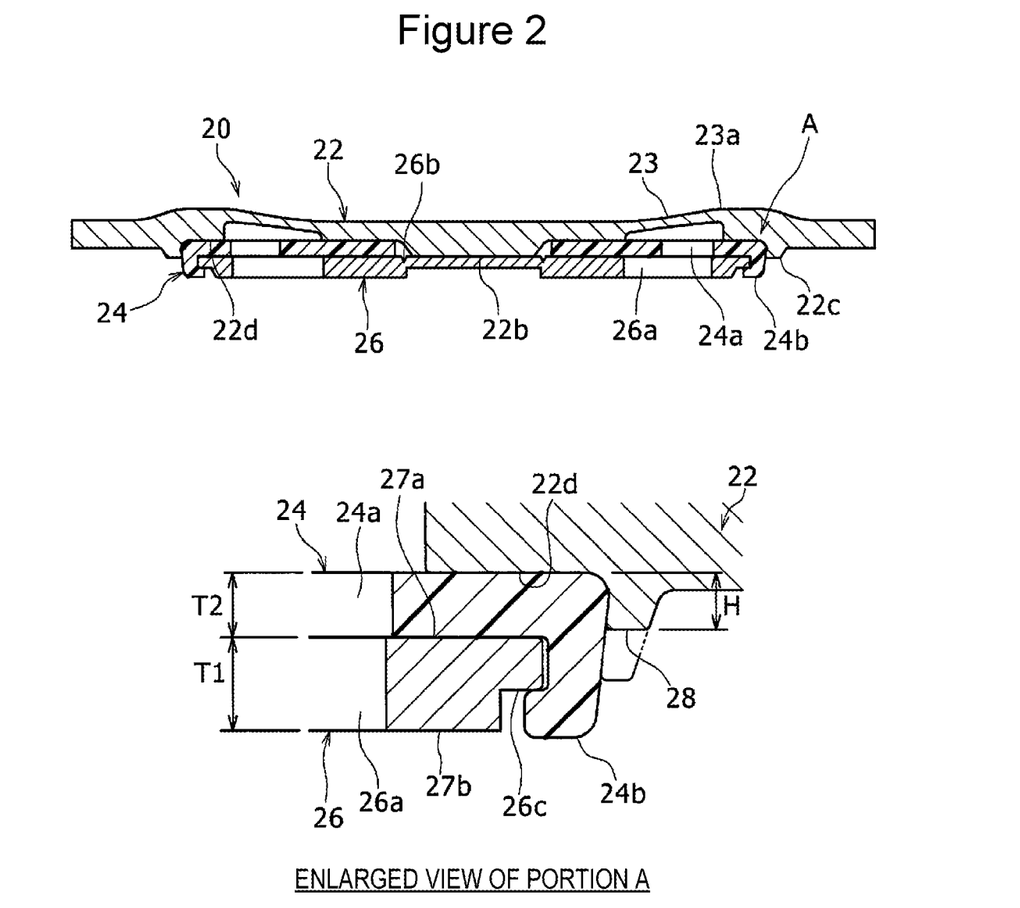
FIG. 2 is a set of a sectional view of a sealing unit and an enlarged view of a portion thereof.

FIG. 1 is a sectional view of a cylindrical battery 10 according to an embodiment of the present invention. FIG. 2 is a set of a sectional view of a sealing unit 20 and an enlarged view of a portion thereof. The cylindrical battery 10 is, for example, a nonaqueous electrolyte secondary battery.

As illustrated in FIG. 1, the cylindrical battery 10 includes a bottomed cylindrical exterior case 12 and, accommodated in the exterior case, an electrode assembly 14 and an electrolytic solution which is not shown. The open end portion of the exterior case 12 is crimped to fix the sealing unit 20 via a gasket 16, thereby sealing the inside of the battery.

The sealing unit 20 is composed of a valve member 22, an insulating plate 24 and a metal plate 26. The sealing unit 20 constitutes a current interrupting mechanism. The valve member 22 and the metal plate 26 are connected together through their central portions, and the insulating plate 24 is interposed between outer peripheral portions of these members. In the present embodiment, the valve member 22 is exposed outside of the battery and serves as an external terminal (more specifically, a positive electrode terminal).

The current interrupting mechanism is actuated in the following manner. A vent hole 26a is disposed in the metal plate 26, and the insulating plate 24 has a vent hole 24a. If the pressure inside the battery is increased, the valve member 22 receives the pressure through the vent holes 26a and 24a. As a result, the valve member 22 acts to pull a connected portion 25 of the metal plate 26 that is connected thereto farther toward the battery's surrounding as the pressure inside the battery is raised. If the pressure inside the battery reaches a predetermined value, the metal plate 26 is ruptured at the connected portion 25 that is connected to the valve member 22 or at a thinner portion 26b (see FIG. 2) of the metal plate 26 to interrupt the current path between the valve member 22 and the metal plate 26. If the inner pressure of the battery is thereafter elevated further after the actuation of the current interrupting mechanism, the valve member 22 is ruptured at a thinnest portion 23a of a sloping region 23 disposed in the valve member 22, thereby releasing the gas from the inside of the battery.

The valve member 22 may be fabricated by pressing a plate material made of aluminum or an aluminum alloy. Aluminum and aluminum alloys are highly flexible and are thus preferable as the materials of the valve members 22. The surface of the valve member 22 which is directed to the inside of the battery has a central projecting portion 22b and an outer peripheral protrudent portion 22c. The central projecting portion 22b can facilitate establishing a connection with the metal plate 26 and can offer a space in which the insulating plate 24 is interposed between the valve member 22 and the metal plate 26.

The outer peripheral protrudent portion 22c is annular in plan view. The protrudent portion 22c fixes the metal plate 26 through the insulating plate 24. The protrudent portion 22c may be a ring which is continuous in the circumferential direction, or may be a collection of protrusions disposed at spacings along the circumferential direction.

The sloping region 23 is disposed on the surface of the valve member 22 which is directed to the inside of the battery. In this sloping region, the thickness decreases continuously along the radial direction from the inner periphery to the outer periphery. The outer periphery of the sloping region 23 is defined by the thinnest portion 23a having the smallest thickness. Under the sloping region 23 is a space which is triangle in cross section and annular in plan view. This space is continuous to the vent hole 24a in the insulating plate 24 and the vent hole 26a in the metal plate 26.

The insulating plate 24 may be any material which can ensure insulation and does not adversely affect the battery characteristics. Preferred materials of the insulating plates 24 are polymer resins, with examples including polypropylene (PP) resins and polybutylene terephthalate (PBT) resins.

As illustrated in FIG. 1 and FIG. 2, the insulating plate 24 has a skirt portion 24b which is disposed at its outer periphery so as to extend toward the inside of the battery and thereby to ensure that the protrudent portion 22c of the valve member 22 can hold the metal plate 26 through the insulating plate 24. The metal plate 26 is fitted within the inner periphery of the skirt portion 24b, and thus the protrudent portion 22c of the valve member 22 can hold the metal plate 26 through the insulating plate 24. A tip portion of the skirt portion 24b may be bent toward the center of the valve member 22, that is, toward the projecting portion 22b. In this manner, the metal plate 26 and the skirt portion 24b may be assembled with an engagement between a flange portion 26c disposed on the outer periphery of the metal plate and the tip of the skirt portion, and thereby the metal plate 26 can be reliably prevented from misalignment with respect to the insulating plate 24.

The sealing unit 20 is assembled as described below. First, a valve member 22, an insulating plate 24 and a metal plate 26 for constituting a sealing unit 20 are provided. Next, the metal plate 26 is fitted into the inside of a skirt portion 24b of the insulating plate 24, and subsequently the insulating plate 24 is fitted into the inside of a protrudent portion 22c of the valve member 22. Thereafter, the protrudent portion 22c of the valve member 22 is pressed toward the center so that the protrudent portion 22c fixes the metal plate 26 through the insulating plate 24. During this process, the metal plate 26 is preferably fixed by pressing the protrudent portion 22c so that the inner peripheral lateral side of the protrudent portion is inclined inward at a predetermined angle (for example, about 20°) relative to the axis of the cylindrical battery 10 (the axis of coiling of the electrode assembly 14). The above two procedures for fitting the members together may be performed in the reversed order.

The valve member 22 and the metal plate 26 are preferably connected together after the completion of the above fitting process for the reason that the connection can be accomplished while the valve member 22 and the metal plate 26 are stationary relative to each other and thus the variation in bond strength is reduced. Similarly to the valve member 22, the metal plate 26 is preferably formed of aluminum or an aluminum alloy. In this case, the valve member 22 and the metal plate 26 may be connected to each other easily. These members are preferably connected together by laser welding.

As illustrated in FIG. 2, the metal plate 26 has a first surface portion 27a on the side thereof adjacent to the valve member 22, and a second surface portion 27b on the side thereof opposite from the valve member. The tip 28 of the protrudent portion 22c of the valve member 22 is located at a level which does not reach the level of the second surface portion 27b of the metal plate 26 in the direction of thickness of the sealing unit 20. The direction of thickness of the sealing unit 20 coincides with the axial direction of the cylindrical battery 10. In other words, when the height dimension from the bottom of a recessed portion 22d of the valve member 22 to the tip 28 of the protrudent portion 22c is denoted by H, the thickness of the metal plate 26 by T1, and the thickness of the insulating plate 24 by T2, the height dimension H is designed to be smaller than the sum of the thickness T1 of the metal plate 26 and the thickness T2 of the insulating plate 24. In still other words, the location of the tip 28 of the protrudent portion 22c of the valve member 22 is above the level of the second surface portion 27b of the metal plate 26 provided that the side of the cylindrical battery 10 in FIG. 1 in which there is the sealing unit 20 is taken as "upside" and the side in which there is the electrode assembly 14 is taken as "downside". Incidentally, while metal plate 26 has thin portions such as the thinner portion 26b and the flange portion 26c, the first surface portion 27a and the second surface portion 27b are selected from the surface of the flat plate portion having the largest thickness of the metal plate 26.

In the present embodiment, the tip 28 of the protrudent portion 22c is located at a level which does not reach the level of the first surface portion 27a of the metal plate 26 in the direction of thickness of the sealing unit 20. In this case, specifically, the height dimension H of the protrudent portion 22c is designed to be smaller than the thickness T2 of the insulating plate 24 (for example, 0.4 mm). However, the design is not limited thereto and may be such that the tip 28 of the protrudent portion 22c is located at the same level as the first surface portion 27a of the metal plate 26 (that is, H=T2). Alternatively, the tip 28 of the protrudent portion 22c may be located, as indicated by alternate long and short dashed lines in the enlarged view of Portion A in FIG. 2, at a level which falls within the thickness T1 of the metal plate 26 (for example 0.6 mm) (that is, T2<H<(T1+T2)).

In the sealing unit 20 of the cylindrical battery 10 according to the present embodiment, as described hereinabove, the metal plate 26 is fixed to the valve member 22 through the insulating plate 24 in such a manner that the tip 28 of the protrudent portion 22c is located at a level which does not reach, in the direction of thickness of the sealing unit 20, the level of the second surface portion 27b of the metal plate 26. In the event that an external impact applies a load on the sealing unit 20 in the radial direction, the above configuration reduces the amount of load transmitted from the valve member 22 to the metal plate 26 through the protrudent portion 22c, and thus lessens the bending deformation of the metal plate 26. Consequently, it is possible to prevent the occurrence of an internal short-circuit stemming from a contact of the deformed metal plate 26 with the electrode assembly 14.

Next, the electrode assembly 14 will be described. As illustrated in FIG. 1, the electrode assembly 14 used in the present embodiment is one fabricated by winding a positive electrode plate 30 and a negative electrode plate 32 via a separator 34.

For example, the positive electrode plate 30 may be fabricated as follows. First, a positive electrode active material and a binder are kneaded to uniformity in a dispersion medium to give a positive electrode mixture slurry. The binder is preferably polyvinylidene fluoride, and the dispersion medium is preferably N-methylpyrrolidone. A conductive agent such as graphite or carbon black is preferably added to the positive electrode mixture slurry. The positive electrode mixture slurry is applied onto a positive electrode current collector, and the wet film is dried to form a positive electrode mixture layer. During this process, part of the positive electrode current collector is left exposed from the positive electrode mixture layer. The positive electrode mixture layer is then compressed to a predetermined thickness with a roller, and the compressed electrode plate is cut to a predetermined size. Lastly, a positive electrode lead 31 is connected to the exposed portion of the positive electrode current collector. A positive electrode plate 30 is thus obtained.

The positive electrode active material may be a lithium transition metal composite oxide capable of storing and releasing lithium ions. Examples of the lithium transition metal composite oxides include those of the general formulae $LiMO_2$ (M is at least one of Co, Ni and Mn), $LiMn_2O_4$ and $LiFePO_4$. These materials may be used singly, or two or more may be used as a mixture. The material may contain at least one selected from the group consisting of Al, Ti, Mg and Zr, in addition to or in place of the transition metal element.

For example, the negative electrode plate 32 may be fabricated as follows. First, a negative electrode active material and a binder are kneaded to uniformity in a dispersion medium to give a negative electrode mixture slurry. The binder is preferably styrene butadiene (SBR) copolymer, and the dispersion medium is preferably water. A thickening agent such as carboxymethylcellulose is preferably added to the negative electrode mixture slurry. The negative electrode mixture slurry is applied onto a negative electrode current collector, and the wet film is dried to form a negative electrode mixture layer. During this process, part of the negative electrode current collector is left exposed from the negative electrode mixture layer. The negative electrode mixture layer is then compressed to a predetermined thickness with a roller, and the compressed electrode plate is cut to a predetermined size. Lastly, a negative electrode lead 33 is connected to the exposed portion of the negative electrode current collector. A negative electrode plate 32 is thus obtained.

The negative electrode active material may be a carbon material or a metal material which each can store and release lithium ions. Examples of the carbon materials include graphites such as natural graphite and artificial graphite. Examples of the metal materials include silicon, tin and oxides of these metals. The carbon materials and the metal materials may be each used singly, or two or more may be used as a mixture.

The separator 34 may be a microporous film based on a polyolefin such as polyethylene (PE) or polypropylene (PP). A single microporous film, or a stack of two or more such films may be used. In the case where the separator is a stack including two or more layers, it is preferable that a layer based on polyethylene (PE) having a low melting point be an intermediate layer, and polypropylene (PP) having excellent oxidation resistance be a surface layer. Further, inorganic particles such as aluminum oxide ($Al_2O_3$), titanium oxide ($TiO_2$) or silicon oxide ($SiO_2$) may be added to the separator 34. Such inorganic particles may be suspended within the separator or may be applied together with a binder onto the separator surface.

The nonaqueous electrolytic solution may be a solution of a lithium salt as an electrolyte salt in a nonaqueous solvent.

Some nonaqueous solvents that can be used are cyclic carbonate esters, chain carbonate esters, cyclic carboxylate esters and chain carboxylate esters. Preferably, two or more of these solvents are used as a mixture. Examples of the cyclic carbonate esters include ethylene carbonate (EC), propylene carbonate (PC) and butylene carbonate (BC). The cyclic carbonate esters may be substituted with fluorine in place of part of the hydrogen atoms, with examples including fluoroethylene carbonate (FEC). Examples of the chain carbonate esters include dimethyl carbonate (DMC), ethyl methyl carbonate (EMC), diethyl carbonate (DEC) and methyl propyl carbonate (MPC). Examples of the cyclic carboxylate esters include γ-butyrolactone (γ-BL) and γ-valerolactone (γ-VL). Examples of the chain carboxylate esters include methyl pivalate, ethyl pivalate, methyl isobutyrate and methyl propionate.

Examples of the lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$ and $Li_2B_{12}Cl_{12}$. Of these, $LiPF_6$ is particularly preferable. The concentration in the nonaqueous electrolytic solution is preferably 0.5 to 2.0 mol/L. $LiPF_6$ may be mixed with other lithium salt such as $LiBF_4$.

EXAMPLES of the cylindrical batteries 10 according to the embodiment discussed above will be described in detail hereinbelow.

EXAMPLE 1

(Fabrication of Sealing Unit)

A sealing unit 20 illustrated in FIG. 2 was fabricated in the following manner. A valve member 22 and a metal plate 26 with predetermined shapes were fabricated by pressing of metal plates. Aluminum was used for the valve member 22 and the metal plate 26. The thickness T1 of the metal plate 26 was 0.6 mm. A thermoplastic resin plate made of polypropylene was punched into an annular shape. Thereafter, the ring was hot molded into a sectional profile illustrated in FIG. 2, and a vent hole 24a was formed therein, thereby fabricating an insulating plate 24. The thickness T2 of the insulating plate 24 was 0.4 mm.

A central projecting portion 22b and an outer peripheral protrudent portion 22c were formed in the valve member 22. At this stage, the protrudent portion 22c stood vertically relative to the plane surface of the valve member 22. The height dimension H of the protrudent portion 22c from the bottom of a recessed portion 22d was 0.8 mm. The protrudent portion 22c consisted of a single annular protrusion. Further, a sloping region 23 was formed around the projecting portion 22b. The outer peripheral thinnest portion 23a of the sloping region 23 serves as an origin of fracture when the valve member 22 functions as a safety valve upon an increase in pressure inside the battery.

A thinner region was formed in the center of the metal plate 26, and a thinner portion 26b which was annular in plan view and V-shaped in cross section was formed within that region. This thinner portion 26b functions as a current interrupting section. Further, a vent hole 26a was perforated in the metal plate 26.

The metal plate 26 fabricated as described above was fitted within the inner periphery of a skirt portion 24b of the insulating plate 24 so that the metal plate 26 would be held by the insulating plate 24. Next, the insulating plate 24 holding the metal plate 26 was fitted within the inner periphery of the protrudent portion 22c of the valve member 22. Thereafter, the protrudent portion 22c was pressed in the inward direction, and thereby the protrudent portion 22c was crimped to fix the metal plate 26. After the crimping, the projecting portion 22b of the valve member 22, and the metal plate 26 were connected to each other by laser welding. A sealing unit 20 was thus fabricated.

(Fabrication of Positive Electrode Plate)

A lithium nickel composite oxide represented by $LiNi_{0.91}Co_{0.06}Al_{0.03}O_2$ was used as a positive electrode active material. 100 Parts by mass of the positive electrode active material, 1 part by mass of acetylene black (AB) as a conductive agent, and 1 part by mass of polyvinylidene fluoride (PVdF) as a binder were mixed together. The mixture was kneaded in N-methyl-2-pyrrolidone (NMP) as a dispersion medium to give a positive electrode mixture slurry. The positive electrode mixture slurry was applied onto both sides of a 13 μm thick aluminum foil as a positive electrode current collector, and was dried to form positive electrode mixture layers. During this process, part of the positive electrode current collector was left exposed from the positive electrode mixture layer. The positive electrode mixture layers were then compressed with a roller to a packing density of 3.6 g/cm³, and the compressed electrode plate was cut to a predetermined size. Lastly, a positive electrode lead 31 made of aluminum was connected to the exposed portion of the positive electrode current collector. A positive electrode plate 30 was thus fabricated.

(Fabrication of Negative Electrode Plate)

A mixture of 93 parts by mass of graphite and 7 parts by mass of silicon oxide (SiO) was used as a negative electrode active material. 100 Parts by mass of the negative electrode active material, 1 part by mass of carboxymethylcellulose (CMC) as a thickening agent, and 1 part by mass of styrene butadiene rubber (SBR) as a binder were mixed together. The mixture was kneaded in water as a dispersion medium to give a negative electrode mixture slurry. The negative electrode mixture slurry was applied onto both sides of a 6 μm thick copper foil as a negative electrode current collector, and was dried to form negative electrode mixture layers. During this process, part of the negative electrode current collector was left exposed from the negative electrode mixture layer. The negative electrode mixture layers were then compressed with a roller to a packing density of 1.65 g/cm³, and the compressed electrode plate was cut to a predetermined size. Lastly, a negative electrode lead 33 made of nickel was connected to the exposed portion of the negative electrode current collector. A negative electrode plate 32 was thus fabricated.

(Fabrication of Electrode Assembly)

The positive electrode plate 30 and the negative electrode plate 32 were wound together via a separator 34 to form an electrode assembly 14. The separator 34 used herein was a microporous polyethylene film which had on one side a heat resistant layer including polyamide and alumina ($Al_2O_3$) filler.

(Preparation of Nonaqueous Electrolytic Solution)

A nonaqueous solvent was prepared by mixing ethylene carbonate (EC), dimethyl carbonate (DMC) and ethyl methyl carbonate (EMC). Lithium hexafluorophosphate ($LiPF_6$) as an electrolyte salt was dissolved into the nonaqueous solvent so that its concentration would be 1 mol/L. A nonaqueous electrolytic solution was thus prepared.

(Fabrication of Cylindrical Battery)

As illustrated in FIG. 1, a lower insulating plate 36 was placed under the electrode assembly 14, and the electrode assembly 14 was inserted into a bottomed cylindrical exterior case 12. The negative electrode lead 33 was connected to the bottom of the exterior case 12 by resistance welding. Next, an upper insulating plate 38 was placed on top of the electrode assembly 14, and a portion of the exterior case 12 near the open end was plastically deformed to form a U-shaped hollow 13 in the circumferential direction. The positive electrode lead 31 was connected to the metal plate 26, and the sealing unit 20 was fitted onto the hollow 13 of the exterior case 12 via a gasket 16 and was fixed there by crimping. A cylindrical battery 21 mm in outer diameter and 70 mm in height was thus fabricated.

EXAMPLE 2

A cylindrical battery of EXAMPLE 2 was fabricated in the same manner as in EXAMPLE 1, except that the height dimension H of the protrudent portion 22c of the valve member 22 was changed to 0.6 mm.

EXAMPLE 3

A cylindrical battery of EXAMPLE 3 was fabricated in the same manner as in EXAMPLE 1, except that the height dimension H of the protrudent portion 22c of the valve member 22 was changed to 0.4 mm.

EXAMPLE 4

A cylindrical battery of EXAMPLE 4 was fabricated in the same manner as in EXAMPLE 1, except that the height dimension H of the protrudent portion 22c of the valve member 22 was changed to 0.2 mm.

COMPARATIVE EXAMPLE 1

A cylindrical battery of COMPARATIVE EXAMPLE 1 was fabricated in the same manner as in EXAMPLE 1, except that the height dimension H of the protrudent portion 22c of the valve member 22 was changed to 1.2 mm. Since the thickness T1 of the metal plate 26 was 0.6 mm, the thickness T2 of the insulating plate 24 was 0.4 mm, and the total thereof was 1.0 mm, the tip 28 of the protrudent portion 22c in this case was about 0.2 mm below the level of the second surface portion 27b of the metal plate 26 fixed to the valve member 22 through the insulating plate 24.

COMPARATIVE EXAMPLE 2

A cylindrical battery of COMPARATIVE EXAMPLE 2 was fabricated in the same manner as in EXAMPLE 1, except that the height dimension H of the protrudent portion 22c of the valve member 22 was changed to 1.0 mm. Since the thickness T1 of the metal plate 26 was 0.6 mm, the thickness T2 of the insulating plate 24 was 0.4 mm, and the total thereof was 1.0 mm, the tip 28 of the protrudent portion 22c in this case was located at the same height (or at the same level) as the second surface portion 27b of the metal plate 26 fixed to the valve member 22 through the insulating plate 24.

(Flat Crush Test)

Ten batteries of each of EXAMPLES 1 to 4 and COMPARATIVE EXAMPLES 1 and 2 were subjected to a flat crush test. The batteries after the test were disassembled, and the degrees of the deformation of the metal plate 26 of the sealing unit 20 were examined. Specifically, the cylindrical battery was first charged in an environment at 25° C. at a constant current of 0.3 It (=1050 mA) to a battery voltage of 4.2 V. The charged cylindrical battery was crushed between 20 cm×20 cm square stainless steel plates under a load of 20 kN at a speed of 30 mm/sec for 10 seconds. The battery after the test was disassembled. The direction in which the cylindrical battery was crushed was across the body of the battery (specifically, the pressure was applied onto the lateral side of the exterior case 12). The results are described in Table 1 below.

designed so that the height dimension H of the protrudent portion 22c was 0.8 mm or less and the tip 28 was located above the level of the second surface portion 27b of the metal plate 26. The reasons behind the above results are probably because decreasing the height dimension H of the protrudent portion 22c can stabilize the manner in which the metal plate 26 is deformed by the protrudent portion 22c during crushing, and thereby the risk of contact with the electrode assembly 14 is successfully reduced. Based on the above results, it can be said that the tip 28 of the protrudent portion 22c is advantageously located at a level which does not reach the level of the second surface portion 27b of the metal plate 26, and is more preferably located at a level which is the same as or does not reach the level of the first surface portion 27a of the metal plate 26.

The configurations of the cylindrical batteries according to the present invention are not limited to the embodiment described hereinabove and modified examples thereof, and may be modified and improved in various manners.

Figure 3:
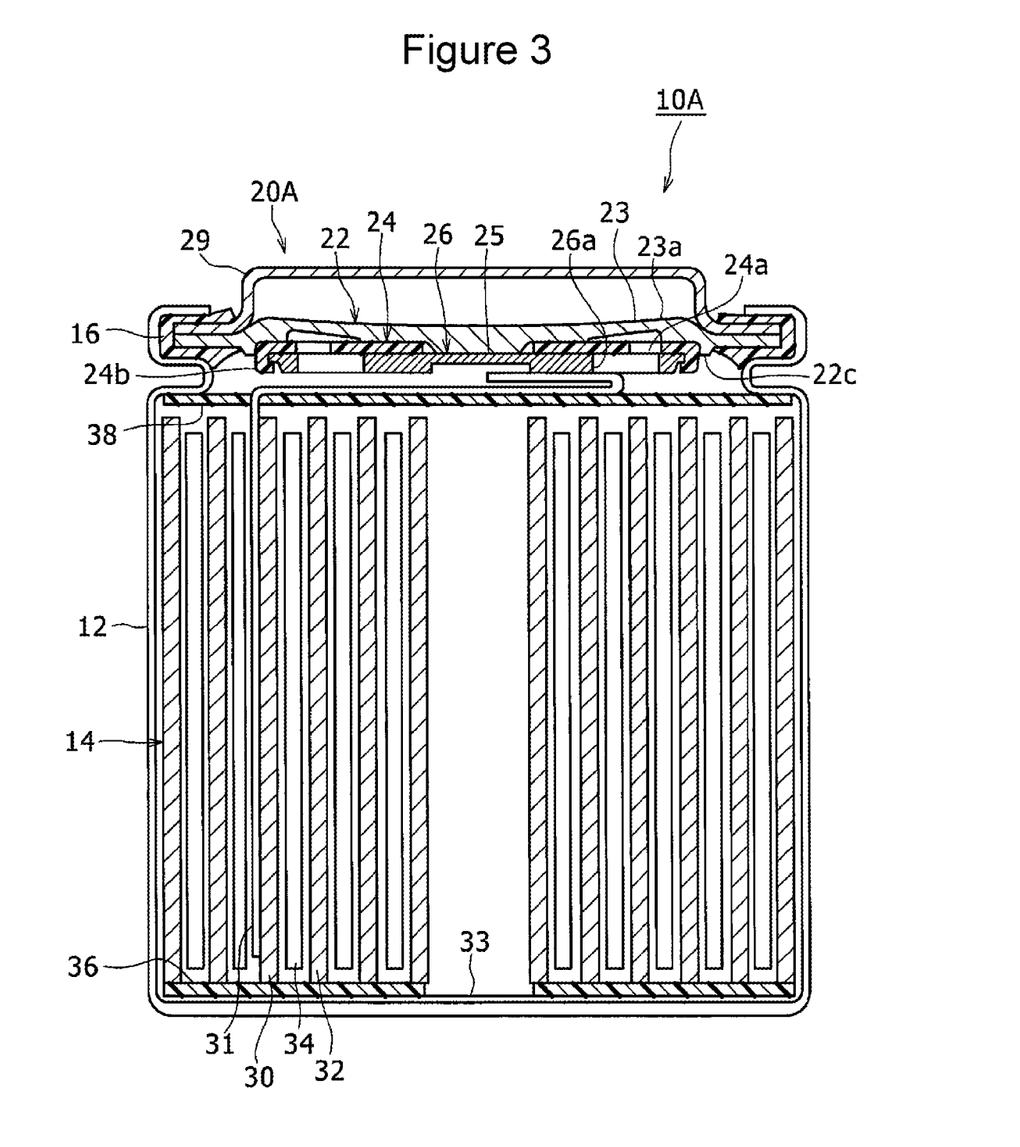
FIG. 3 is a sectional view of a cylindrical battery according to another embodiment in which a sealing unit includes a terminal cap.

For example, while the above embodiment has illustrated the valve member 22 as being exposed on the outside of the cylindrical battery 10 to function as an external terminal, the configuration is not limited thereto. As illustrated in FIG. 3, a cylindrical battery 10A may have a sealing unit 20A which is of a type that a terminal cap 29 is disposed on a valve member 22 and the terminal cap 29 is used as an external terminal. In this case, the terminal cap 29 is protrudent in a substantially columnar shape at a central portion thereof, and has a vent hole which is not shown. Further, an outer peripheral portion of the terminal cap 29 is fixed by crimping of an upper end portion of an exterior case 12 via a gasket 16. The cylindrical battery 10A which has the sealing unit 20A including the terminal cap 29 can benefit from the similar advantageous effects described in the embodiment hereinabove.

REFERENCE SIGNS LIST

10, 10A CYLINDRICAL BATTERY, 12 EXTERIOR CASE, 13 HOLLOW, 14 ELECTRODE ASSEMBLY, 16

TABLE 1

|  | COMP. EX. 1 | COMP. EX. 2 | EX. 1 | EX. 2 | EX. 3 | EX. 4 |
| --- | --- | --- | --- | --- | --- | --- |
| Height dimension H of protrudent portion | 1.2 mm (The tip of the protrudent portion was located below the level of the second surface portion of the metal plate.) | 1.0 mm (The tip of the protrudent portion was located at the same level as the second surface portion of the metal plate.) | 0.8 mm (The tip of the protrudent portion was located a little above the level of the second surface portion of the metal plate.) | 0.6 mm (The tip of the protrudent portion was located at approximately half thickness of the metal plate.) | 0.4 mm (The tip of the protrudent portion was located at the same level as the first surface portion of the metal plate.) | 0.2 mm (The tip of the protrudent portion was located above the level of the first end surface portion of the metal plate.) |
| Contact with electrode assembly due to deformation of metal plate | 8/10 | 2/10 | 0/10 | 0/10 | 0/10 | 0/10 |
| Deformation of metal plate confirmed by disassembling | 10/10 | 4/10 | 1/10 | 1/10 | 0/10 | 0/10 |

As described in Table 1, the test results of EXAMPLES 1 to 4 and COMPARATIVE EXAMPLES 1 and 2 have shown that the metal plate 26 is more resistant to deformation in the crush test and has a smaller risk of contact with the electrode assembly 14 with decreasing height dimension H of the protrudent portion 22c. In particular, the rate of occurrence of a contact with the electrode assembly 14 due to the deformation of the metal plate 26 was significantly low when the protrudent portion 22c of the valve member 22 was GASKET, 20, 20A SEALING UNIT, 22 VALVE MEMBER, 22b PROJECTING PORTION, 22c PROTRUDENT PORTION, 22d RECESSED PORTION, 23 SLOPING REGION, 23a THINNEST PORTION, 24 INSULATING PLATE, 24a, 26a VENT HOLE, 24b SKIRT PORTION, 25 CONNECTED PORTION, 26 METAL PLATE, 26b THINNER PORTION, 26c FLANGE PORTION, 27a FIRST SURFACE PORTION, 27b SECOND SURFACE PORTION, 28 TIP, 29 TERMINAL CAP, 30 POSITIVE ELEC- TRODE PLATE, 31 POSITIVE ELECTRODE LEAD, 32 NEGATIVE ELECTRODE PLATE, 33 NEGATIVE ELECTRODE LEAD, 34 SEPARATOR, 36 LOWER INSULATING PLATE, 38 UPPER INSULATING PLATE

The invention claimed is:

1. A cylindrical battery comprising an electrode assembly including a positive electrode plate and a negative electrode plate wound together via a separator, an electrolytic solution, a bottomed cylindrical exterior case accommodating the electrode assembly and the electrolytic solution, and a sealing unit fixed by crimping of an open end portion of the exterior case via a gasket, wherein the sealing unit comprises a valve member which has an annular protrudent portion projecting toward the inside of the battery, an insulating plate which is fitted within the inner periphery of the protrudent portion and which has an outer peripheral skirt portion, and a metal plate which is fixed within the inner periphery of the skirt portion of the insulating plate and which is connected to a central portion of the valve member, and the metal plate has a first surface portion on a side thereof adjacent to the valve member and a second surface portion on a side thereof opposite from the valve member, and a tip of the protrudent portion is located at a level which does not reach the level of the second surface portion of the metal plate in the direction of thickness of the sealing unit, and wherein the tip of the protrudent portion is located at a level which is the same as or does not reach the level of the first surface portion of the metal plate in the direction of thickness of the sealing unit.

2. The cylindrical battery according to claim 1, wherein the valve member is exposed outside of the battery.

3. The cylindrical battery according to claim 1, wherein the sealing unit further comprises a terminal cap disposed on the valve member.

* * * * *